(12) United States Patent
Seitz et al.

(10) Patent No.: US 10,360,684 B2
(45) Date of Patent: Jul. 23, 2019

(54) METHOD AND APPARATUS FOR EDGE DETERMINATION OF A MEASUREMENT OBJECT IN OPTICAL METROLOGY

(71) Applicant: Carl Zeiss Industrielle Messtechnik GmbH, Oberkochen (DE)

(72) Inventors: Dominik Seitz, Schwaebisch Gmuend (DE); Nils Haverkamp, Aalen (DE)

(73) Assignee: CARL ZEISS INDUSTRIELLE MESSTECHNIK GMBH, Oberkochen (DE)

(*) Notice: Subject to any disclaimer, the term of this patent is extended or adjusted under 35 U.S.C. 154(b) by 0 days.

(21) Appl. No.: 15/496,321

(22) Filed: Apr. 25, 2017

(65) Prior Publication Data

US 2017/0316568 A1    Nov. 2, 2017

(30) Foreign Application Priority Data

Apr. 28, 2016    (DE) .................. 10 2016 107 900

(51) Int. Cl.
    *G06T 7/13*    (2017.01)
(52) U.S. Cl.
    CPC ...... *G06T 7/13* (2017.01); *G06T 2207/10004* (2013.01); *G06T 2207/20216* (2013.01)
(58) Field of Classification Search
    None
    See application file for complete search history.

(56) References Cited

U.S. PATENT DOCUMENTS

| 5,822,055 A | * | 10/1998 | Tsai .................. G01N 21/8806 |
| | | | 356/237.1 |
| 6,130,750 A | * | 10/2000 | Ausschnitt .......... G03F 7/70625 |
| | | | 356/401 |
| 6,183,919 B1 | * | 2/2001 | Ausschnitt ............. G01B 11/02 |
| | | | 430/22 |
| 6,208,749 B1 | * | 3/2001 | Gutkowicz-Krusin ..................... |
| | | | A61B 5/442 |
| | | | 356/303 |

(Continued)

FOREIGN PATENT DOCUMENTS

| CA | 2262912 A1 | * | 8/2000 | ......... G02B 21/0008 |
| CA | 2441726 A1 | * | 8/2000 | ............. G02B 21/06 |

(Continued)

OTHER PUBLICATIONS

Dr. -Ing. Lorenz Wiegers et al.; Automatisierte Bild- & Beleuchtungsoptimierung in der technischen Auflichtsichtprüfung (English language translation attached); Sep. 2002; 32 pp.

(Continued)

*Primary Examiner* — Gandhi Thirugnanam
(74) *Attorney, Agent, or Firm* — Harness, Dickey & Pierce, P.L.C.

(57) ABSTRACT

A method for edge determination of a measurement object in optical metrology, such as performed by an optical coordinate measuring machine. The method includes the steps of capturing first image data of the measurement object under reflected-light illumination, capturing second image data of the measurement object under transmitted-light illumination, and determining a position of an edge of the measurement object based on an evaluation in which both the first and the second image data are used.

8 Claims, 6 Drawing Sheets

(56) References Cited

U.S. PATENT DOCUMENTS

| | | | | |
|---|---|---|---|---|
| 6,248,988 B1* | 6/2001 | Krantz | G02B 21/004 | 250/201.3 |
| 6,650,357 B1* | 11/2003 | Richardson | G01J 3/10 | 348/80 |
| 7,379,173 B2* | 5/2008 | Fairley | G01N 21/8806 | 356/237.4 |
| 7,408,642 B1* | 8/2008 | DiBiase | G03F 9/7076 | 356/399 |
| 7,433,039 B1* | 10/2008 | Levinski | G03F 7/70616 | 356/401 |
| 7,596,242 B2* | 9/2009 | Breed | G06K 9/00362 | 382/103 |
| 8,280,172 B1 | 10/2012 | Campbell et al. | | |
| 8,581,977 B2 | 11/2013 | Niedermeier et al. | | |
| 2002/0054291 A1* | 5/2002 | Tsai | G01N 21/8806 | 356/394 |
| 2003/0021465 A1* | 1/2003 | Adel | G03F 7/70633 | 382/151 |
| 2003/0096302 A1* | 5/2003 | Yguerabide | C12Q 1/6816 | 435/7.1 |
| 2003/0227618 A1* | 12/2003 | Some | G01N 21/9501 | 356/237.1 |
| 2004/0066962 A1* | 4/2004 | Sasa | G01N 21/9501 | 382/141 |
| 2006/0222236 A1* | 10/2006 | Osada | G03F 9/7011 | 382/151 |
| 2009/0066942 A1* | 3/2009 | Mangan | G01N 21/95623 | 356/237.5 |
| 2009/0252398 A1* | 10/2009 | Luther | G06T 5/50 | 382/133 |
| 2010/0188486 A1* | 7/2010 | Amanullah | G01N 21/8806 | 348/48 |
| 2010/0189308 A1* | 7/2010 | Nakatsukasa | G01B 11/24 | 382/106 |
| 2010/0189339 A1* | 7/2010 | Amanullah | G01N 21/8806 | 382/145 |
| 2012/0106702 A1* | 5/2012 | Feke | A61B 5/0059 | 378/63 |
| 2012/0243790 A1* | 9/2012 | Campbell | G01B 11/028 | 382/199 |
| 2013/0225435 A1* | 8/2013 | Clarke | C12Q 1/6809 | 506/9 |
| 2017/0016713 A1* | 1/2017 | Haverkamp | G02B 19/0066 | |
| 2017/0205358 A1* | 7/2017 | Vaez-Iravani | G01N 21/8806 | |
| 2017/0316568 A1* | 11/2017 | Seitz | G06T 7/13 | |

FOREIGN PATENT DOCUMENTS

| | | |
|---|---|---|
| DE | 10 2009 039 254 A1 | 5/2013 |
| DE | 10 2012 103 554 A1 | 6/2013 |
| EP | 2290355 A2 * | 3/2011 ......... G01N 21/9036 |

OTHER PUBLICATIONS

Dr.-Ing. Lorenz Wiegers et al.; Automatisierte Bild- & Beleuchtungsoptimierung in der technischen Auflichtsichtprüfung; Sep. 2002; 15 pp.

German language Examination (English translation included) for Application No. 10 2016 107 900.6; dated Feb. 17, 2017; 12 pp.

* cited by examiner

METHOD AND APPARATUS FOR EDGE DETERMINATION OF A MEASUREMENT OBJECT IN OPTICAL METROLOGY

CROSS-REFERENCES TO RELATED APPLICATIONS

This application claims Convention priority of German patent application 10 2016 107 900.6, filed on Apr. 28, 2016. The entire content of this priority application is incorporated herein by reference.

BACKGROUND OF THE INVENTION

The present disclosure relates to a method for edge determination of a measurement object in optical metrology. The present disclosure furthermore relates to an optical coordinate-measuring machine and to a computer program product for executing the herein presented method.

Coordinate-measuring machines, as are known for example from DE 10 2012 103 554 A1, serve for checking workpieces, for example as part of quality assurance, or for determining the geometry of a workpiece completely as part of what is known as "reverse engineering." Moreover, diverse further application possibilities are conceivable.

In coordinate-measuring machines, different types of sensors may be used to capture the workpiece to be measured. By way of example, sensors that measure in tactile fashion are known in this respect, as are sold by the applicant under the name "VAST XT" or "VAST XXT". Here, the surface of the workpiece to be measured is scanned with a stylus, the coordinates of said stylus in the measurement space being known at all times. Such a stylus may also be moved along the surface of a workpiece in a manner such that a multiplicity of measurement points can be captured at set or known time intervals during such a measurement process as part of what is known as a "scanning method".

It is moreover known to use optical sensors that facilitate contactless capturing of the coordinates of a workpiece. The present disclosure relates to such a coordinate-measuring machine comprising an optical sensor and to an associated method for optical measurement. One example of an optical sensor is the optical sensor sold by the applicant under the product designation "ViScan". An optical sensor of this type can be used in various types of measurement setups or coordinate-measuring machines. Examples of such coordinate-measuring machines are the products "O-SELECT" and "O-INSPECT", which are sold by the applicant.

For an exact measurement, it is mandatory in optical coordinate-measuring machines to provide corresponding illumination of the workpiece to be measured. In addition to what is known as transmitted-light illumination, where the light source is situated, relative to the optical sensor, behind the workpiece, what is known as reflected-light illumination can be alternatively used in order to illuminate the workpiece or the measurement object on its top side, which faces the optical sensor. Illumination that is adapted exactly to the measurement object is of immense importance, in particular because it is possible hereby to improve the bright-to-dark contrast that is necessary in the optical detection of the measurement object. Specifically, during said optical measurement of the measurement object, the measurement object is imaged onto the optical sensor, i.e. a 2D projection of the measurement object onto the sensor plane is produced.

During transmitted-light illumination, regions that are not covered by the measurement object appear bright on the optical sensor. Conversely, regions which are covered by the measurement object appear dark on the optical sensor.

During reflected-light illumination, in particular during bright-field reflected-light illumination, regions of the measurement object that reflect light that is incident thereon appear as bright regions, and regions that do not reflect any light appear as dark regions.

In order to be able to capture the spatial coordinates (2D or 3D coordinates) of the measurement object, first the edges or the position of the edges of the measurement object must be determined. The image data captured by the optical sensor is preferably one or more greyscale image(s). The edges of the measurement object that are to be evaluated for metrological purposes are, for physical reasons, not imaged onto the optical sensor as a binary jump between bright and dark, but as a greyscale profile between bright and dark. The width of this profile is influenced by various factors, such as for example the orientation of the measurement object in the focus plane or the quality/NA of the measurement lens.

The metrological challenge is now to determine the actual position of one or more edges of the measurement object from the image data captured by the optical sensor. More specifically, the challenge is to suitably interpret the greyscale profile produced by the edges of the measurement object in the image data or to apply the criterion at which the edge orientation determined from the greyscale profile corresponds to the physical edge orientation at the measurement object. Fully automated or partially automated, software-based evaluation methods are typically chosen for interpreting the image data and determining the edge. Known edge detection algorithms are, for example, Canny algorithm and Laplacian filter. Other known edge operators are Sobel operator, Scharr operator, Prewitt operator and Roberts operator.

However, it has been found that the above-described type of image evaluation and edge detection can lead to systematic errors. Until now, this type of systematic error has typically been of minor relevance. However, due to more recent measurement methods and an increasing demand for measurement accuracy, this type of measurement deviation increasingly gains in importance. Until now, it has however not yet been possible to find a suitable and cost-effective way of avoiding this type of systematic measurement error.

SUMMARY OF THE INVENTION

It is thus an object to provide a method and an apparatus for edge determination of a measurement object in optical metrology, which overcome the above-mentioned disadvantages. It is particularly an object to minimize as far as possible the systematic measurement errors that occur in the edge interpretation during the optical, metrological evaluation of image data.

According to a first aspect, a method is proposed that comprises the following steps:

capturing first image data of the measurement object under reflected-light illumination;

capturing second image data of the measurement object under transmitted-light illumination; and determining a first preliminary edge position of an edge of the measurement object by evaluating the first image data;

determining a second preliminary edge position of the edge of the measurement object by evaluating the second image data; and determining the edge position of the measurement object by forming an average between the first and second preliminary edge positions, wherein forming an average includes forming a weighted average that is weighted dependent on a dimension of the measurement object parallel to an optical axis of an optical sensor with which the first and second image data is captured, and/or dependent on an inclination of a surface of the measurement object relative to the optical axis.

According to a second aspect, a method is proposed that comprises the following steps:

capturing first image data of the measurement object under reflected-light illumination;

capturing second image data of the measurement object under transmitted-light illumination;

forming synthesized image data by synthesizing the first and second image data, wherein each of the first and the second image data is normalized before the synthesized image data is formed; and determining a position of an edge of the measurement object based on the synthesized image data According to a further aspect, a coordinate-measuring machine is proposed, comprising:

an optical sensor for capturing image data of a measurement object;

a first illumination device for producing a reflected-light illumination of the measurement object;

a second illumination device for producing a transmitted-light illumination of the measurement object; and a control device which is configured to illuminate the measurement object by means of the first illumination device and in the process to capture first image data by means of the optical sensor, and to illuminate the measurement object by means of the second illumination device and in the process to capture second image data by means of the optical sensor, and wherein the control device is configured to determine a position of an edge of the measurement object based on an evaluation in which both the first and the second image data is used.

Furthermore proposed is a computer program comprising a program code that is configured to execute the above-mentioned methods by means of said coordinate-measuring machine if the program code is executed in the control device of the coordinate-measuring machine.

It has been possible to show, by way of measurements of calibrated structures, that the above-mentioned systematic measurement errors, which frequently occur in the optical, metrological edge interpretation, result in the determined edge position being in principle a little too far "in the bright region" as compared to the actual edge position. The grey-scale profile from bright to dark that is caused by an edge of the measurement object in the image data is typically erroneously interpreted to mean that the determined edge position appears a little too far in the bright region as compared to the real edge position. This measurement error is dependent on the type of illumination. For example, it has been shown that a circular structure having a diameter of 160 μm under transmitted-light illumination, in which the circular structure itself appears to be dark and the area around it appears to be bright, is measured as being too large by about 500 nm. Conversely, it has been shown that the same circular structure under reflected-light illumination, in which the circular structure itself appears to be bright and the area around it appears to be dark, is measured as being too small by about 500 nm. It is to be understood that this applies not only to circular structures or to exactly calibrated structures.

Overall, it has thus been found that a certain type of symmetry of the measurement deviations exists in the case of reflected-light illumination as compared to transmitted-light illumination. It has also been found that this type of measurement deviations is independent of the nominal diameter of the measurement object, with nominal diameter referring to the size of the measurement object in the two-dimensional measurement plane. An error during the calibration of the imaging scale or an influence of any wavelength differences of the types of illumination could also be ruled out.

Consequently, the present disclosure is based on the idea of compensating the above-mentioned systematic measurement errors in the optical edge interpretation by both capturing image data of the measurement object under reflected-light illumination and capturing image data of the measurement object under transmitted-light illumination. The first-mentioned image data will here be referred to as "first image data" for ease of distinction. The second-mentioned image data that are captured under transmitted-light illumination will be referred to here as "second image data".

The edge position is determined based on an evaluation in which both the first and the second image data is used. Since both image data sets are used, that is to say the image data captured under reflected light and the image data captured under transmitted light, it is possible to compensate said measurement errors, because here the symmetry of the measurement errors under reflected-light illumination as compared to transmitted-light illumination can be utilized or averaged out.

In the above-described example, the structure to be measured appears too large under transmitted light and too small by exactly the same or at least almost the same amount under reflected light. So if both types of image information are used in the evaluation, it is possible to determine the edge position of the measurement object much more exactly than in the otherwise typical manner (using the typical edge detection algorithms).

According to the first embodiment of the herein presented method, the method step of determining the edge position of the measurement object includes the following steps: (i) determining a first preliminary edge position of the edge of the measurement object by evaluating the first image data; (ii) determining a second preliminary edge position of the edge of the measurement object by evaluating the second image data; and (iii) determining the edge position of the measurement object by forming an average between the first and second preliminary edge positions.

Consequently, in this alternative, first the edge position is determined in the first image which was recorded under reflected-light illumination. Separately, the edge position is then determined in the second image which was recorded under transmitted-light illumination. Next, an average is formed between the edge positions which were thus determined (in the present case referred to as the first and second "preliminary edge position").

Preferably, an arithmetic average is formed. For the above-mentioned example of measuring a circular structure having a diameter of 160 μm, this would give an exact result of the ultimately determined edge position. Forming the average would bring the respective measurement errors, which in the present example gave a measurement of the circle structure diameter that was too large by 500 nm under transmitted-light illumination and gave a measurement of the circle structure diameter that was too small by 500 nm under reflected light, to an exact balance of the errors of zero.

Even if the measurement errors under reflected light and transmitted light are not exactly symmetric with respect to one another, this type of forming an average between the edge position that was found based on the first image data and the edge position that was found based on the second image data still brings an improvement in accuracy, because it has been possible to show that the interpreted edge orientation in each case is determined to be too far in the bright region of the edge transition and that these effects under reflected-light illumination and transmitted-light illumination are correspondingly opposite each other, since the bright and dark regions in an image produced under reflected light are complementary to the bright and dark regions in an image produced under transmitted light.

Forming an average preferably includes forming a weighted average, wherein the weighting of this average is dependent on a dimension of the measurement object parallel to an optical axis of an optical sensor with which the first and second image data is captured, and/or dependent on an inclination of a surface of the measurement object relative to the optical axis.

The imaging differences in reflected-light illumination as compared to transmitted-light illumination that naturally occur in the case of edges of the measurement object that are not parallel to the optical axis of the optical sensor can thus likewise be compensated for. However, it is to be understood that the knowledge of at least the rough form of the measurement object is a prerequisite for defining the weighting. This is typically the case in practice, however.

According to the second embodiment of the herein presented method, the method step of determining the edge position of the measurement object includes the following steps: (i) forming synthesized image data by means of a synthesis of the first and second image data; and (ii) determining the edge position of the measurement object based on the synthesized image data.

In contrast to the first embodiment which was explained further above and in which the two image data sets are initially evaluated separately from each other so as to separately establish the edge position in each of the two images and to then average them, the data sets of the two images in the present embodiment are initially combined to form a synthesized data set so as to then determine the edge position of the measurement object in the synthesized data set. For this purpose, both image data sets, i.e. the first and the second image data, are preferably initially normalized. This normalization comprises a normalization of the dynamic range of the first image data and of the dynamic range of the second image data to the same shared value.

A dynamic range of image data in the present case is understood to mean the quotient or the difference of the largest and smallest grey level that is distinguishable from noise or grain. To eliminate noise and minor sensor defects, the image data is therefore preferably filtered before the normalization such that any grey-level anomalies or grey-level outliers are filtered out, such as by means of a Gaussian filter. The grey levels remaining in the image data are then normalized in as much as the maximum remaining grey levels both in the first image data and in the second image data are set to a common maximum value and the minimum grey levels in both image data sets are set to a common minimum value. The grey levels of the remaining pixels between the normalized maximum and minimum grey levels are accordingly scaled in both image data sets.

This produces, aside from the above-mentioned systematic measurement errors, exact complementary images. In other words, the normalized first image of the measurement object recorded under reflected-light illumination is a complementary image of the normalized second image of the measurement object recorded under transmitted-light illumination. Deviations from this complementary behaviour are now only caused by the above-mentioned systematic measurement errors or asymmetries or oblique edge positions of the measurement object relative to the optical axis.

In the second embodiment, which utilizes the synthesis of the first and second image data, the edge position of the measurement object is preferably determined by means of identifying positions in the synthesized image data at which grey levels in the normalized first image data correspond to the grey levels in the normalized second image data. In order to form the synthesized image data, the difference in the grey levels between the pixels of the normalized first image data and the pixels of the normalized second image data, which are arranged at the corresponding image positions, is preferably formed in a pixel-wise manner. This grey level difference is formed, in a pixel-wise manner, for all corresponding pixels in the first and second image data sets. The position of the edge of the measurement object can then be assumed to be where the grey levels of the thus obtained synthesized difference image are zero or at least approximately zero.

However, it is to be understood that the formation of the synthesized image is not strictly speaking necessary at all, because the above-mentioned criterion of identifying pixel positions at which the grey-level difference of both image data sets is zero is tantamount to identifying pixel positions at which the grey levels in both image data sets are equal. The formation of synthesized image data for this type of evaluation is therefore not mandatory.

According to a further refinement, the method includes the following further steps: (i) rotating the measurement object about a horizontal axis; (ii) capturing third image data of the rotated measurement object under reflected-light illumination; (iii) capturing fourth image data of the rotated measurement object under transmitted-light illumination; (iv) determining a further position of the edge of the measurement object based on an evaluation in which both the third and the fourth image data is used; and (v) comparing the edge position of the measurement object that was determined based on the first and second image data to the further edge position of the measurement object that was determined based on the third and fourth image data.

In this refinement, two images are captured of the measurement object in the original position (first and second image data sets) and two images of the measurement object are captured in the position after a preferably 180° rotation (third and fourth image data sets). For both positions of the measurement object, in each case one image is produced under reflected-light illumination (first and third image data sets) and one image is produced under transmitted-light illumination (second and fourth image data sets). The edge position is then determined based on one of the above-mentioned variants once using the first and second image data sets and, separately therefrom, using the third and fourth image data sets. The two edge positions which are determined in the process are then compared to one another. This comparison makes it possible to check whether or not the surface adjoining the determined edge is parallel to the optical axis. This is because if such a surface is at an angle relative to the optical axis, a difference in the edge position necessarily occurs that was determined based on the first and second image data sets, compared to the edge position that was determined based on the third and fourth image data sets (in the present case referred to as "further position of the edge of the measurement object").

It is to be understood that the determination of the further edge position can be made based on the third and fourth image data sets in the same way as was described above in relation to edge detection based on the first and second image data sets, specifically either by means of a separate determination of the edge positions in the third image data and in the fourth image data and subsequent averaging between the preliminary edge positions which were thus separately determined, or by forming synthesized image data and determining the edge position of the measurement object based on the synthesized image data.

In order to discover whether the surface which adjoins the edge of the measurement object that is to be determined is parallel to or at an angle to the optical axis of the sensor, it is possible in the above-described scenario to also compare in each case the two image data sets which were recorded under reflected-light illumination and the two image data sets which were recorded under transmitted-light illumination. In this case, the first image data would thus be compared to the third image data, and the second image data would be compared to the fourth image data. More specifically, the edge position that was determined based on the first image data is then compared to the edge position that was determined based on the third image data. In the same way, the edge position that was determined based on the second image data is compared to the edge position that was determined based on the fourth image data. The differences that result in each case from these two comparisons are necessarily exclusively caused by the geometry of the measurement object.

The last-mentioned refinement would thus comprise the following further steps: (i) determining a first preliminary edge position of the edge of the measurement object by evaluating the first image data; (ii) determining a second preliminary edge position of the edge of the measurement object by evaluating the second image data; (iii) rotating the measurement object about a horizontal axis; (iv) capturing third image data of the rotated measurement object under reflected-light illumination; (v) capturing fourth image data of the rotated measurement object under transmitted-light illumination; (vi) determining a third preliminary edge position of the edge of the measurement object by evaluating the third image data; (vii) determining a fourth preliminary edge position of the edge of the measurement object by evaluating the fourth image data; (viii) comparing the first preliminary edge position to the third preliminary edge position; and (ix) comparing the second preliminary edge position with the fourth preliminary edge position.

According to a further refinement, the method additionally includes the following step: determining spatial coordinates of the measurement object based on the determined edge of the measurement object.

The procedure described for edge identification is thus preferably performed not only for one, but for a plurality of, with particular preference for all edges of the measurement object. As soon as the outline edges of the measurement object have been identified, it is possible to establish the spatial coordinates of the measurement object. It is to be understood that for this purpose, as also for determining the edge position, the image data is assigned a correspondingly normalized dot matrix, based on which the pixel data can be converted to SI data, with the result that the pixel distances occurring in the image data can be converted into real distances and be assigned to a known reference coordinate system.

The reflected-light illumination is preferably bright-field reflected-light illumination. The transmitted-light illumination is preferably bright-field transmitted-light illumination.

It is understood that the aforementioned features and those yet to be explained below may be used not only in the respectively specified combination but also in other combinations or on their own, without departing from the spirit and scope of the present disclosure. It is likewise understood that the above-mentioned embodiments and refinements, which were predominantly described with reference to the methods according to the disclosure, also apply in corresponding fashion to the apparatus according to the disclosure or can be implemented in the latter.

BRIEF DESCRIPTION OF THE DRAWINGS

Exemplary embodiments are shown in the drawings and are explained in greater detail in the following description. In the figures.

DESCRIPTION OF PREFERRED EMBODIMENTS

Figures 1A, 1B:
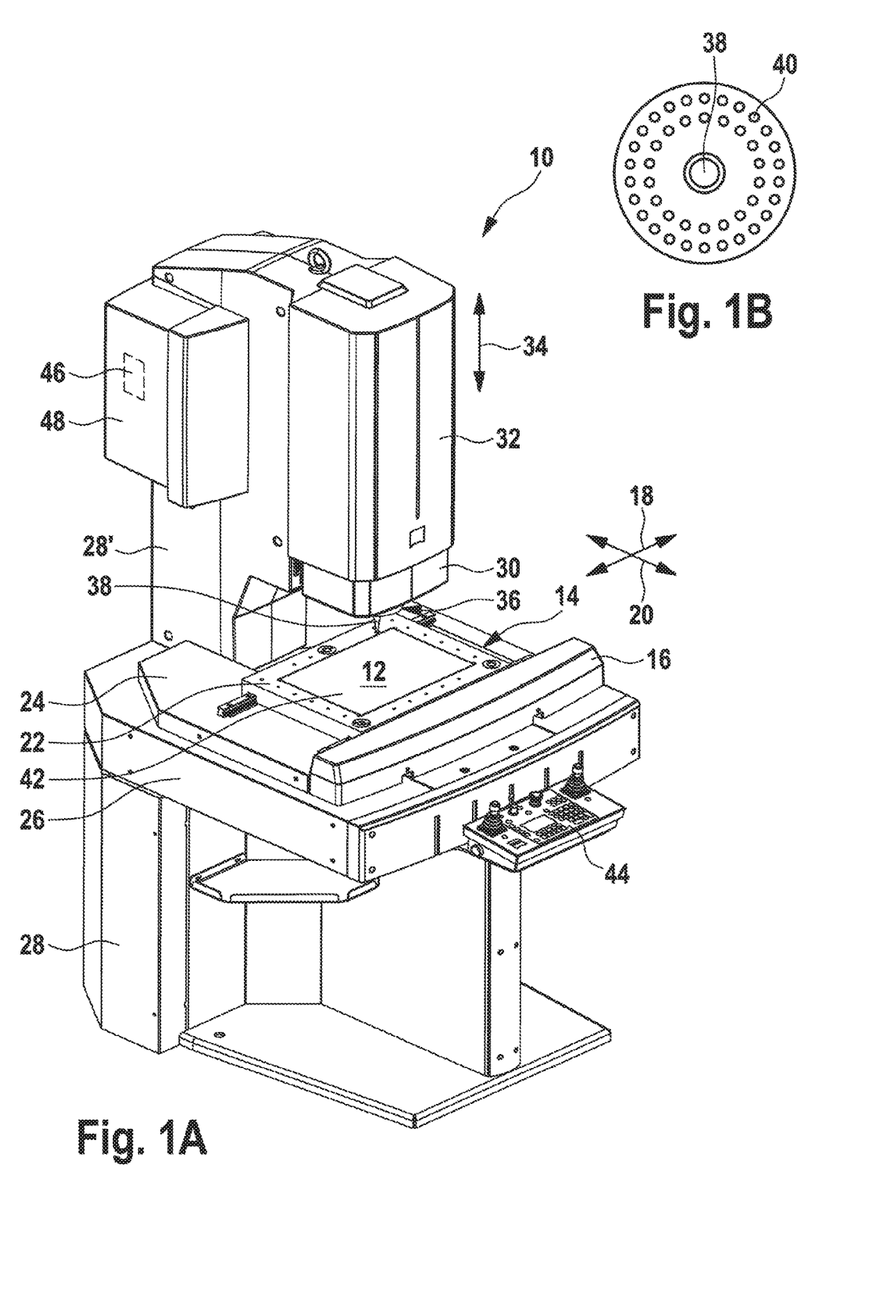
FIG. 1A shows a perspective view of an exemplary embodiment of a coordinate-measuring machine.
FIG. 1B shows a schematic illustration of an optical sensor with associated illumination device, which can be used in the coordinate-measuring machine illustrated in FIG. 1A, wherein the schematic illustration represents a plan view from below of the optical sensor and the associated illumination device.

FIG. 1A shows a coordinate-measuring machine according to an exemplary embodiment of the present disclosure. The coordinate-measuring machine as a whole is here designated with the reference numeral 10.

The coordinate-measuring machine 10 comprises a workpiece holder 12, on which the workpiece or measurement object to be measured can be placed. This workpiece holder 12 is arranged on a measurement table 14. Depending on the embodiment of the coordinate-measuring machine, said measurement table can be a fixed, that is to say a non-moving measurement table. However, in the embodiment illustrated in FIG. 1A, the measurement table 14 is one which is linearly displaceable along two mutually orthogonally aligned coordinate axes 18, 20 in the measurement table plane using a positioning device 16. The first coordinate axis 18 is normally referred to as the X-axis, and the second coordinate axis 20 is normally referred to as the Y-axis.

In the exemplary embodiment of the coordinate-measuring machine 10 shown in FIG. 1, the measurement table 14 is implemented in a construction type known as a cross table. It comprises an X-table 22 that is linearly displaceable along the first coordinate axis 18 (X-axis), on whose top side the workpiece holder 12 is arranged. The X-table 22 in turn is arranged on a Y-table 24, which is parallel to the former and is used to linearly displace the workpiece holder 12 along the second coordinate axis 20 (Y-axis). The Y-table 24 in turn is arranged on a solid base plate 26, also frequently referred to as the main plate 26. The base plate 26 serves as the carrier structure for the measurement table 14 and is usually connected in integrated fashion with a machine frame 28.

The machine frame 28 also comprises, in addition to the lower part which supports the base plate 26, an upper part 28', which is typically, but not absolutely necessarily connected in integrated fashion with the lower part of the machine frame 28. This upper part 28' of the machine frame 28 is frequently also referred to as the Z-column.

In the exemplary embodiment of the coordinate-measuring machine 10 shown in FIG. 1A, what is known as a Z-carriage 30 is mounted on the Z-column 28' such that it is linearly displaceable. This Z-carriage 30 is guided, preferably using a linear guide, within a carriage housing 32, which is fixedly connected to the Z-column 28. The Z-carriage 30 is thus displaceable along a third coordinate axis 34, which is usually referred to as the Z-axis, in a manner orthogonal to the measurement table 14 or orthogonal to the two other coordinate axes 18, 20. Arranged on the bottom side of the Z-carriage 30, which faces the measurement table 14, is a measurement head 36. The measurement head 36 comprises one or more sensors, depending on the embodiment of the coordinate-measuring machine 10. In the present case, the measurement head 36 comprises an optical sensor 38, which can be used to optically capture the measurement object to be measured, which is placed on the workpiece holder 12. It is possible using this optical sensor 38 to capture image data of the measurement object. For this purpose, preferably a camera with a high-resolution optical unit is used. Image data are here generally understood to mean images or image sequences of the measurement object.

The coordinate-measuring machine 10 furthermore comprises a first illumination device 40 (see FIG. 1B) for producing reflected-light illumination of the measurement object. This first illumination device 40 is used to appropriately illuminate the measurement object that has been placed on the measurement table 14, or on the workpiece holder 12, during capturing of the image data. The illumination using the first illumination device 40 is effected, as is typical of reflected-light illuminations, from the lens-side as viewed from the measurement object, i.e. from the side of the optical sensor 38. To this end, the illumination device 40 comprises one or more luminous means which are preferably arranged around the optical sensor 38. It is to be understood that the arrangement of the luminous means of the illumination device 40, which is schematically illustrated in FIG. 1B, is merely one of many possibilities.

The coordinate-measuring machine 10 furthermore comprises a second illumination device 42 for producing transmitted-light illumination of the measurement object. The illumination by means of this second illumination device 42 is effected, as is typical of transmitted-light illuminations, from behind the measurement object as viewed from the optical sensor 38. The illumination device 42 is therefore preferably integrated in the measurement table 14 or arranged underneath it. The workpiece holder 12 is for this reason preferably light-transmissive.

The coordinate-measuring machine 10 furthermore comprises operating and switching instruments 44, with which a user can manually control or position the optical sensor 38 and the workpiece holder 12.

A control unit or control device 46 (both terms are used in equivalent fashion here) is arranged, according to the exemplary embodiment shown in FIG. 1A, in a receiving container 48 which is mounted on the Z-column 28'. This control unit 46 serves for controlling a plurality of components of the coordinate-measuring machine 10. Among other things, it is also configured to perform the herein presented method. In this respect, corresponding software with a program code is preferably installed in the control unit 46, with the program code being configured to perform the method when it is executed in the control unit 46.

It is to be understood that the coordinate-measuring machine 10 which is shown in FIG. 1A is merely one of many possible exemplary embodiments of a coordinate-measuring machine that falls within the spirit and scope of the present disclosure. The measurement table 14 can in principle also be configured to be non-moving. The manner in which the measurement head 36 is suspended at the machine frame 28 may also differ in principle. In particular, the kinematics with which the measurement head 36 and the measurement object are moved relative to one another can have a different constructive design. The coordinate-measuring machine 10 further includes the optical sensor 38, the two illumination devices 40, 42, and the control device 46, the function of which will be explained in more detail below.

Figure 2:
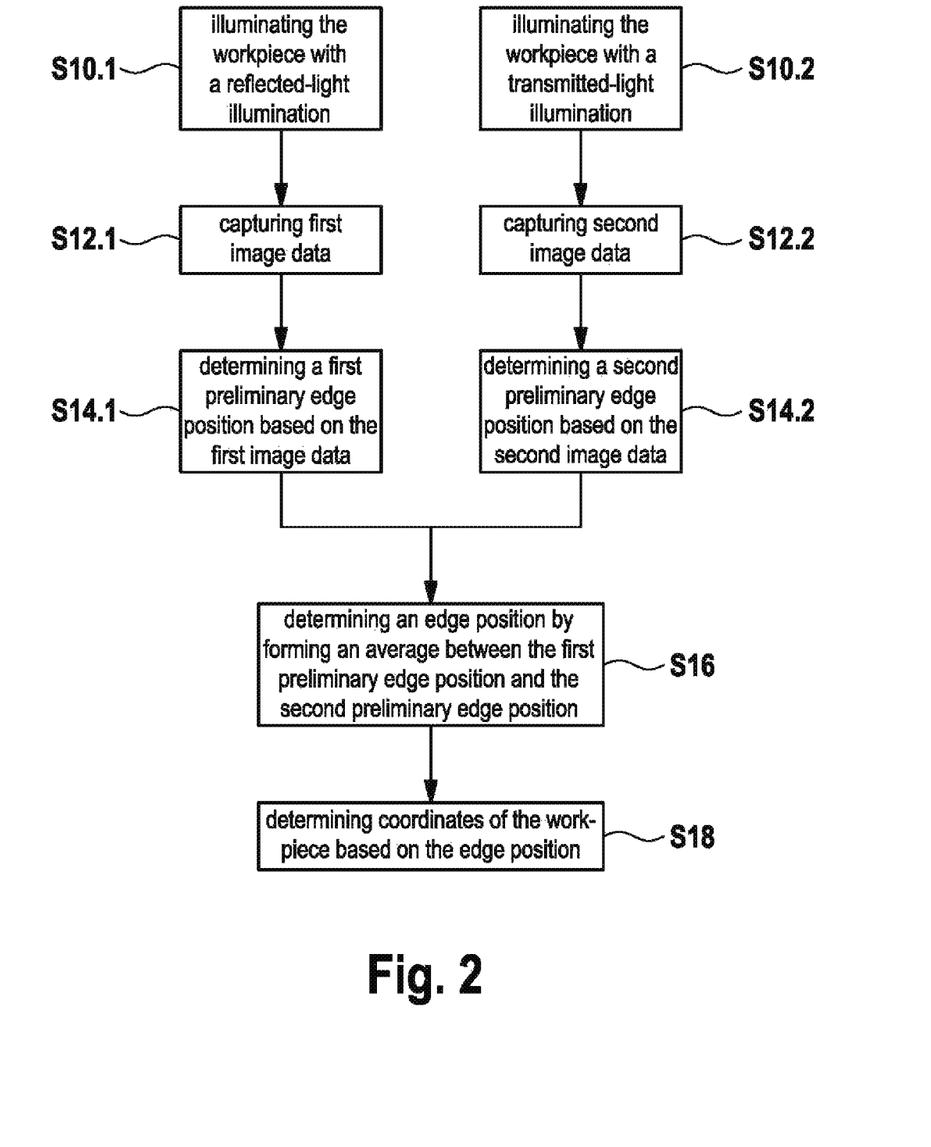
FIG. 2 shows a schematic flowchart for elucidating a first exemplary embodiment of the herein presented method.

The herein presented method, which is preferably implemented in the control device 46 of the coordinate-measuring machine 10 on software and/or hardware basis is schematically illustrated in a flowchart in an embodiment variant in FIG. 2. Here, in a first method step S10.1 the measurement object to be measured is initially positioned on the workpiece holder 12, and then a reflected-light illumination scenario that is individually adapted to the measurement object is produced by means of the first illumination device 40. In step S12.1, first image data of the measurement object which is thus illuminated is then captured by means of the optical sensor 38. This image data of the measurement object that is recorded under reflected-light illumination is evaluated in the control device 46 in step 14.1.

The control device 46 is configured to evaluate the first image data such that the position and orientation of one or more edges of the measurement object therein can be determined. This type of evaluation for edge determination of the measurement object is the typical measurement step in optical metrology, which precedes the subsequent determination of the spatial coordinates of the measurement object. Typically, edge detection algorithms which are customary in image processing in this regard are used, such as the Canny edge filter.

The result of the method step S14.1 is thus a determined edge position of the measurement object. Even though in practice usually not only the position of one edge of a measurement object is to be determined, but usually a plurality of, or all, edges of the measurement object are to be determined, the present text mentions only the determination of one edge position for the sake of simplicity, since this is the simplest case imaginable.

The steps S10.1-S14.1 are subsequently repeated in modified form (see method steps S10.2-S14.2). The method steps S10.2-S14.2 are modified in as much as the measurement object is now no longer optically captured under reflected-light illumination, but under transmitted-light illumination. In step S10.2, a transmitted-light illumination of the measurement object is produced by means of the second illumination device 42. In step S12.2, second image data of the measurement object is captured by means of the optical sensor 38. This second image data captured under transmitted-light illumination is in turn evaluated correspondingly in the control device 46. In the method step S14.2, similar to the method step S14.1, the edge position of the measurement object is determined, but in this case based on the second image data captured in step 12.2.

Since the edge positions which were determined in steps S14.1 and S14.2 are subsequently processed further or evaluated, they are here referred to as "first preliminary edge position" (result from step S14.1) and "second preliminary edge position" (result from step S14.2).

It is to be understood that the method steps S10.2-S14.2 can also take place before the method steps S10.1-S14.1, since it does not matter in principle whether the measurement object is first optically captured in the reflected-light illumination scenario or in the transmitted-light illumination scenario. These steps are therefore shown schematically parallel to each other in FIG. 2.

In method step S16, the "final" edge position is then determined, specifically by forming an average between the first preliminary edge position that is determined in method step S14.1 and the second preliminary edge position that is determined in method step S14.2. This is preferably done based on the formation of an arithmetic average of both preliminary edge positions. Depending on the thickness and/or the geometry of the measurement object, the two image data sets or the two preliminary edge positions can also be given different weightings. As already mentioned above, a systematic error in the edge interpretation is averaged out or reduced with this type of average formation.

In the last step S18, the coordinates of the measurement object are then determined based on the previously detected edge positions.

Figure 5A:
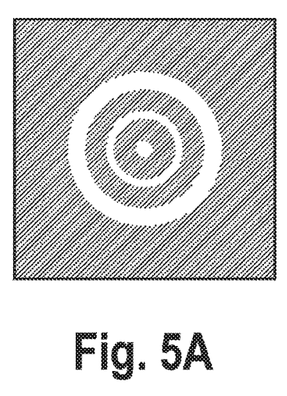
FIGS. 5A, 5B show an image of an exemplary test structure recorded under reflected-light illumination and transmitted-light illumination.
Figure 5B:
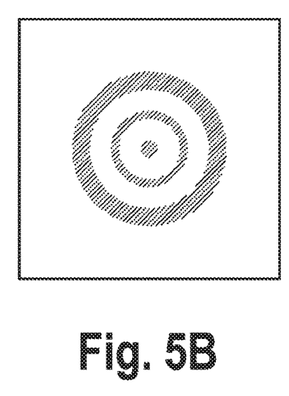

FIG. 5A shows an image of an exemplary calibration structure that was recorded under reflected-light illumination. FIG. 5B shows the corresponding image of the calibration structure recorded under transmitted-light illumination.

The structures that appear bright in FIG. 5A appear dark in FIG. 5B and vice versa. The reason is in particular that under bright-field reflected-light illumination, regions of the measurement object that reflect the light that is incident thereon appear bright, whereas regions that do not reflect light appear dark. Conversely, regions on the optical sensor 38 that are not covered by the measurement object appear bright under transmitted-light illumination, whereas regions that are covered by the measurement object appear dark on the optical sensor 38.

Figure 6A:
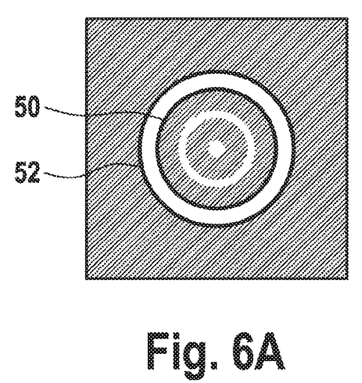
FIGS. 6A, 6B show the images, shown in FIG. 5A and FIG. 5B, with an indicated edge that was determined therein.
Figure 6B:
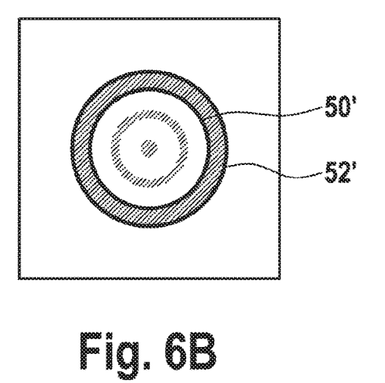

FIGS. 6A and 6B schematically illustrate the error that typically occurs in such cases, which is of a systematic nature. This is because it has been shown that the conventional edge detection algorithms, which use a physically incorrect edge profile interpretation or an edge profile interpretation that has not been adapted to the edge geometries to be measured, typically localize the edge too far "in the bright region". The diameter of the smaller ring 50 is therefore typically measured as being somewhat too large under reflected-light illumination (see FIG. 6A). The larger ring 52, on the other hand, is typically measured as being too small under reflected-light illumination (see FIG. 6A). Conversely, the diameter of the smaller ring 50' is typically measured as being too small under transmitted-light illumination, and the diameter of the larger ring 52' is typically measured as being somewhat too large (see FIG. 6B).

These measurement errors are averaged out with the method, which is described with reference to FIG. 2, and thus significantly reduced. The calibration structure illustrated in FIGS. 5A, 5B and 6A, 6B is, for example, a structure in which the smaller circle 50 has an actual diameter of 120 µm, and the larger circle 52 has an actual diameter of 160 µm. However, the individual evaluation of the image data under reflected light (FIG. 6A) and under transmitted light (FIG. 6B) gave the following results in a trial carried out by the applicant: $D_{120, Rl}$=120.7 µm; $D_{120, Tl}$=119.5 µm; $D_{160, Rl}$=159.4 µm; $D_{160, Tl}$=160.7 µm, wherein Rl stands for reflected light and Tl stands for transmitted light. The average formation performed in the method step S16 would in this case then give determined diameters of $D_{120}$=(120.7 µm+199.5 µm): 2=120.1 µm and $D_{160}$=(159.4 µm+160.7 µm): 2=160.05 µm. The diameters of the circles 50 and 52 of the calibration structure which were determined using the herein presented method would therefore merely have a measurement deviation of 100 nm and 50 nm. As compared to the diameters or edge positions which were ascertained from the individual images and have a measurement deviation in the range of 400 to 700 nm, this thus represents a significant improvement.

Figure 3:
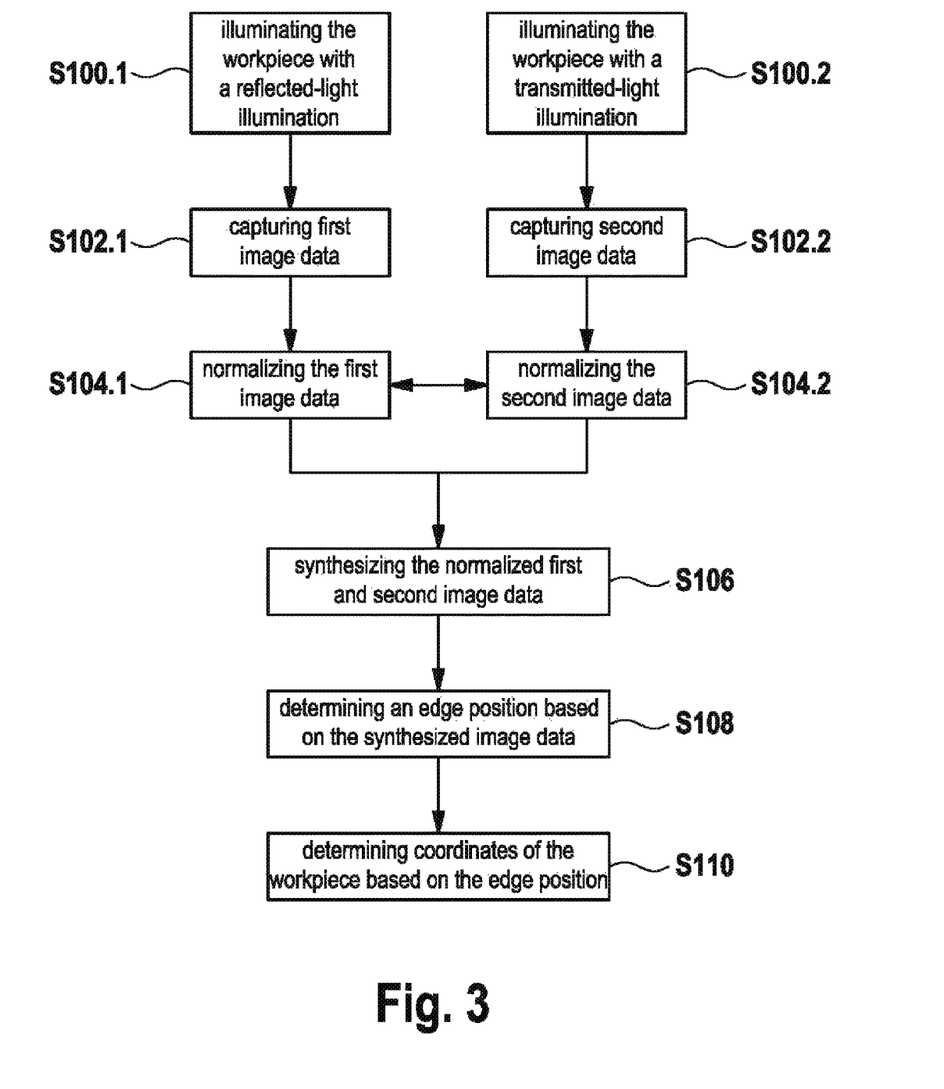
FIG. 3 shows a schematic flowchart for elucidating a second exemplary embodiment of herein presented the method.

The exemplary embodiment of the method illustrated schematically in FIG. 3 follows the same solution approach, specifically likewise the averaging out of the systematic measurement errors by means of an evaluation in which both the image data captured under reflected light (first image data) and the image data captured under transmitted light (second image data) is used. However, preliminary edge positions in this embodiment are not initially determined separately in both image data sets and subsequently averaged. Instead, the image data is normalized, synthesized, and subsequently the edge positions in the synthesized image data are determined.

Specifically, this is effected as follows: steps S100.1, S100.2, S102.1 and S102.2 correspond to steps S10.1, S10.2, S12.1 and S12.2 of the method according to the first exemplary embodiment. First and second image data of the measurement object is here also captured once under reflected-light illumination and once under transmitted light illumination.

In steps S104.1 and S104.2, the first and second image data is normalized in each case. Both image data sets are here normalized to the same dynamic range, with the result that the minimum grey level in the first image data also corresponds to the minimum grey level in the second image data, and the maximum grey level in the first image data also corresponds to the maximum grey level in the second image data. Grey level outliers which occur due to noise, grain or minor defects of the optical sensor 38 are filtered out before or at the same time as said normalization.

According to the method steps S104.1 and S104.2, the normalized first image data produced under reflected light substantially corresponds to the inversion of the normalized second image data produced under transmitted light.

In method step S106, the normalized first and the normalized second image data is then either synthesized, wherein synthesized image data is formed by difference formation of the two image data sets, or the grey levels of the normalized first and second image data are compared to one another.

In the former case, the edge position is determined in step S108 by determining positions in the synthesized image data at which the grey levels of the synthesized difference image data are zero or at least approximately zero. It is to be understood that the determination of the exact position here takes place preferably by appropriate interpolation.

In the second case mentioned, the edge position is determined in step S108 by identifying positions at which the grey levels both in the normalized first image data and in the normalized second image data correspond to one another. It is to be understood that both alternatives should provide exactly the same result, because the search for positions with grey levels of identical value in both normalized image data sets corresponds to the search of positions at which the grey levels in the synthesized difference image data are zero.

In the final optional method step S110, as in the method step S18 according to the first exemplary embodiment, the coordinates (2D or 3D coordinates) of the measurement object are calculated based on the determined edge positions.

Figure 4:
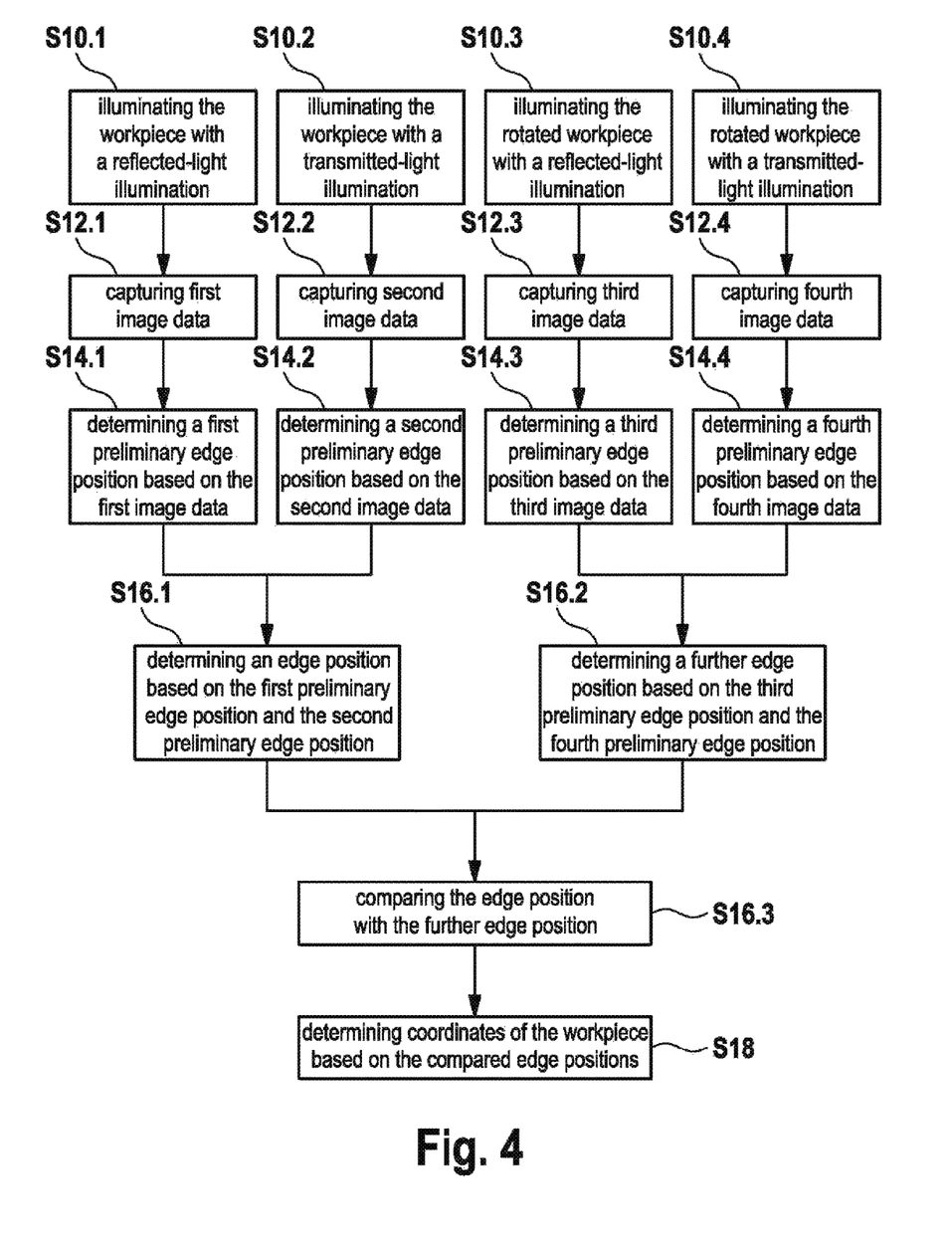
FIG. 4 shows a schematic flowchart for elucidating a third exemplary embodiment of the herein presented method.

FIG. 4 schematically shows a third exemplary embodiment of the herein presented method. In this exemplary embodiment, not "only" two image data sets of the measurement object are captured, as was done previously, but a total of four image data sets. However, as previously in the method steps S10.1, S12.1, S14.1 and S10.2, S12.2, S14.2, respectively, initially the first and second image data of the measurement object is captured, and subsequently the first and second preliminary edge positions are each determined separately based on said two image data sets, as was explained further above with reference to the example in FIG. 2. In addition, third and fourth image data sets of the measurement object are captured and evaluated separately from one another in method steps S10.3, S12.3, S14.3 and S10.4, S12.4, S14.4, respectively. In these third and fourth image data sets, the measurement object is optically captured in equivalent fashion as in the first and second image data sets in each case once under reflected-light illumination and once under transmitted-light illumination, but in this case in a position that is rotated by 180° about a horizontal axis of the measurement object.

Figure 7A:
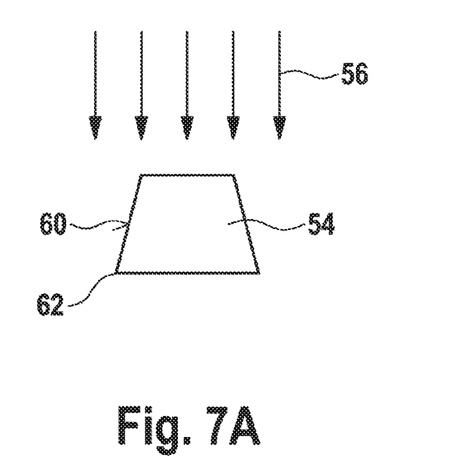
FIGS. 7A, 7B show a principle diagram for schematically elucidating the reflected-light illumination and transmitted-light illumination of an exemplary measurement object.
Figure 7B:
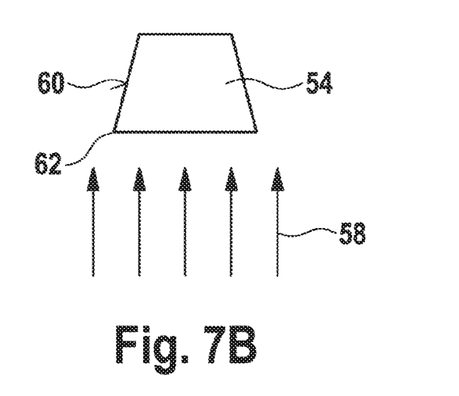
Figure 8A:
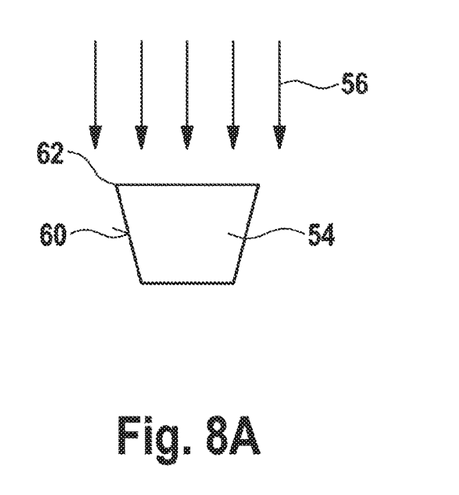
FIGS. 8A, 8B show a principle diagram for schematically elucidating the reflected-light illumination and transmitted-light illumination of the measurement object which is shown by way of example, wherein the measurement object is rotated by 180° as compared to the situation shown in FIGS. 7A and 7B.
Figure 8B:
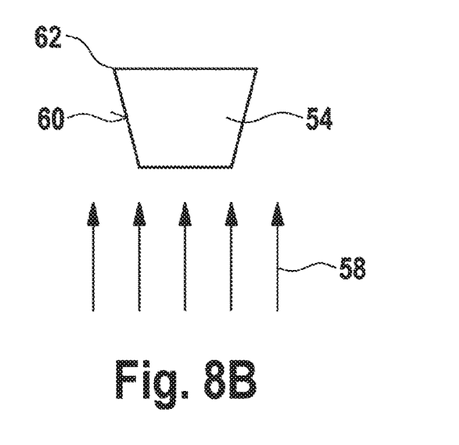

FIGS. 7A, 7B, 8A and 8B show schematic diagrams in which the respective illumination conditions and positions of the measurement object are illustrated schematically. An exemplary measurement object is illustrated therein in cross-section and designated with the reference numeral 54. The illumination is illustrated in schematic fashion by means of arrows 56, 58. The reference numeral 56 designates the reflected-light illumination. The reference numeral 58 designates the transmitted-light illumination. The optical sensor 38 (not illustrated in FIGS. 7 and 8) would therefore in both these diagrams be positioned above the measurement object 54. FIG. 7A therefore shows the illumination conditions and position of the measurement object 54 at the time the first image data is recorded. FIG. 7B shows the illumination conditions and position of the measurement object 54 at the time the second image data is recorded. FIG. 8A shows the illumination conditions and position of the measurement object 54 at the time the third image data is recorded. FIG. 8B shows the illumination conditions and position of the measurement object 54 at the time the fourth image data is recorded.

By comparing and/or averaging these four image data sets, it is now possible not only to average out the systematic errors occurring in edge detection, as was already mentioned above, but also to ascertain whether or not the lateral surfaces 60 of the measurement object 54 that adjoin the edges of the measurement object 54 that are to be determined are inclined relative to the optical axis of the measurement sensor 38 (preferably vertical axis). That is because, if the measurement object 54 has a substantially trapezoidal cross section, as in the example shown in FIGS. 7 and 8, the four individual evaluations of the first, second, third and fourth image data give different results with respect to the edge position of the edge 62 of the measurement object 54. Especially the evaluation of the first and third image data sets, which were both captured under reflected-light illumination, would here in particular give different results with respect to the edge position 62 (compare situation in FIG. 7A and FIG. 8A). By contrast, the evaluation of the second and fourth image data sets, which were both captured under transmitted-light illumination, would in all likelihood give the same results with respect to the edge position 62 of the measurement object 54 (compare situation in FIGS. 7B and 8B).

It is thus possible to perform different, possible evaluations in the method steps S16.1, S16.2 and S16.3. For example, the edge position can be determined by evaluating the first and second image data (step S16.1). This evaluation can be performed either as with respect to the first exemplary embodiment in step S16 or as with respect to the third exemplary embodiment in step S106. Parallel therewith, the edge position can be determined based on the third and fourth image data (step S16.2). The edge positions determined in steps S16.1 and S16.2 can then be compared to one another. If these two edge positions match, it is clear that the surface 60 of the measurement object 54 is perpendicular or parallel to the optical axis of the optical sensor 38. However, if the two results from steps S16.1 and S16.2 do not match, it is clear that the surface 60 is inclined relative to the optical axis of the optical sensor 38.

In the first case (edge positions match), the coordinates of the measurement object 54 can then be calculated in step S18. In the second case (edge positions do not match), further evaluations can be performed to determine the inclination of the surface 60. This is the case, for example, by the comparison of the two image data sets recorded under reflected-light illumination 56, specifically by comparing the first and third image data, and by the comparison of the two image data sets recorded under transmitted-light illumination 58, specifically the second and fourth image data.

With an appropriate evaluation of the four image data sets it is thus possible not only to average out the systematic errors that typically occur due to the edge detection algorithm, but also to identify inclined surfaces and establish their inclination.

What is claimed is:

1. Method for edge determination of a measurement object in optical metrology, comprising the steps of:
   capturing first image data of the measurement object under reflected-light illumination;
   capturing second image data of the measurement object under transmitted-light illumination;
   determining a first preliminary edge position of an edge of the measurement object by evaluating the first image data;
   determining a second preliminary edge position of the edge of the measurement object by evaluating the second image data; and determining an edge position of the measurement object based on the first and second preliminary edge positions;

rotating the measurement object about a horizontal axis;

capturing third image data of the rotated measurement object under reflected-light illumination;

capturing fourth image data of the rotated measurement object under transmitted-light illumination;

determining a third preliminary edge position of the edge of the measurement object by evaluating the third image data;

determining a fourth preliminary edge position of the edge of the measurement object by evaluating the fourth image data;

determining a further edge position of the measurement object based on the third and fourth preliminary edge positions; and comparing the edge position of the measurement object with the further edge position of the measurement object;

wherein determining the edge position of the measurement object comprises forming an arithmetic average between the first and second preliminary edge positions, and wherein determining the further edge position of the measurement object comprises:

forming an arithmetic average between the third and fourth preliminary edge positions.

2. Method according to claim 1, wherein the first image data of the measurement object is captured under bright-field reflected-light illumination, and wherein the second image data of the measurement object is captured under bright-field transmitted-light illumination.

3. Method for edge determination of a measurement object in optical metrology, comprising the steps of:

capturing first image data of the measurement object under reflected-light illumination;

capturing second image data of the measurement object under transmitted-light illumination;

forming synthesized image data by synthesizing the first and second image data, wherein each of the first and the second image data is normalized before the synthesized image data is formed; and determining a position of an edge of the measurement object based on the synthesized image data, wherein determining the position of the edge of the measurement object based on the synthesized image data comprises determining positions at which grey levels in the normalized first image data correspond to grey levels in the normalized second image data and positions at which a difference between the grey levels of the normalized first image data and the grey levels of the normalized second image data is zero.

4. Method according to claim 3, wherein normalizing the first and second image data comprises:

normalizing a dynamic range of the first image data to a predefined value and normalizing a dynamic range of the second image data to said predefined value.

5. Method according to claim 3, wherein the first image data of the measurement object is captured under bright-field reflected-light illumination, and wherein the second image data of the measurement object is captured under bright-field transmitted-light illumination.

6. Method for edge determination of a measurement object in optical metrology, comprising the steps of:

capturing first image data of the measurement object under reflected-light illumination;

capturing second image data of the measurement object under transmitted-light illumination;

forming synthesized image data by synthesizing the first and second image data, wherein each of the first and the second image data is normalized before the synthesized image data is formed; and determining a position of an edge of the measurement object based on the synthesized image data;

rotating the measurement object about a horizontal axis;

capturing third image data of the rotated measurement object under reflected-light illumination;

capturing fourth image data of the rotated measurement object under transmitted-light illumination;

determining a further position of the edge of the measurement object based on an evaluation in which both the third and the fourth image data is used; and comparing the edge position of the measurement object that was determined based on the first and second image data to the further edge position of the measurement object that was determined based on the third and fourth image data.

7. Method according to claim 6, wherein determining the further edge position of the measurement object comprises:

forming second synthesized image data by synthesizing the third and fourth image data; and determining the further edge position of the measurement object based on the second synthesized image data.

8. Coordinate-measuring machine, comprising:

an optical sensor for capturing image data of a measurement object;

a first illumination device for producing a reflected-light illumination of the measurement object;

a second illumination device for producing a transmitted-light illumination of the measurement object; and a control device which is configured to:

illuminate the measurement object by means of the first illumination device and capture first image data by means of the optical sensor, illuminate the measurement object by means of the second illumination device and capture second image data by means of the optical sensor, normalize each of the first and the second image data, form synthesized image data by synthesizing the normalized first and second image data, and determine a position of an edge of the measurement object based on the synthesized image data, wherein determining the position of the edge of the measurement object based on the synthesized image data comprises determining positions at which grey levels in the normalized first image data correspond to grey levels in the normalized second image data and positions at which a difference between the grey levels of the normalized first image data and the grey levels of the normalized second image data is zero.

* * * * *